US008132359B1

(12) United States Patent
Hudak

(10) Patent No.: US 8,132,359 B1
(45) Date of Patent: Mar. 13, 2012

(54) REVOLVING SOLAR POWERED FLOWER POT SAUCER

(76) Inventor: George Hudak, Bethpage, NY (US)

( * ) Notice: Subject to any disclaimer, the term of this patent is extended or adjusted under 35 U.S.C. 154(b) by 367 days.

(21) Appl. No.: 12/454,291

(22) Filed: May 15, 2009

Related U.S. Application Data

(60) Provisional application No. 61/130,089, filed on May 28, 2008.

(51) Int. Cl.
A47G 7/00 (2006.01)

(52) U.S. Cl. ............................................. 47/39; 108/22

(58) Field of Classification Search ............... 47/71, 39; 108/104, 22, 21; 248/131
See application file for complete search history.

(56) References Cited

U.S. PATENT DOCUMENTS

| 3,360,885 | A |   | 1/1968  | St. Clair   |      |
|-----------|---|---|---------|-------------|------|
| 4,026,067 | A |   | 5/1977  | Wengel      |      |
| 4,051,627 | A |   | 10/1977 | Schilling, Jr. |   |
| 4,175,354 | A |   | 11/1979 | Anderson    |      |
| D280,881  | S | * | 10/1985 | Nolles et al. | D8/1 |
| 4,969,290 | A |   | 11/1990 | Skoretz     |      |
| 5,079,645 | A |   | 1/1992  | Ritter      |      |
| 5,152,099 | A |   | 10/1992 | Nilssen     |      |
| 5,896,699 | A |   | 4/1999  | Livingston et al. | |
| 6,128,854 | A |   | 10/2000 | Chaney      |      |

FOREIGN PATENT DOCUMENTS

| CN | 201831420 U | * | 5/2011 |
| GB | 2067837 A   | * | 7/1981 |
| GB | 2305117 A   | * | 4/1997 |

* cited by examiner

Primary Examiner — Kristen Hayes
(74) Attorney, Agent, or Firm — Emery L. Tracy

(57) ABSTRACT

A flower pot saucer for receiving a flower pot or the like is provided. The flower pot saucer comprises a base having an outer surface and a flat annular top surface angled downward toward the outer surface. A revolving saucer is mounted within top surface of the base with the flower pot positionable upon the revolving saucer. At least one solar panel is positioned on the angled top surface of the base. A motor is mounted within the base and powered only by the solar panel with the motor connected between the solar panel and the revolving saucer and the motor causing the rotation of the revolving saucer wherein the junction of the outer surface and the top surface of the base creates an outer edge and wherein the angling of the top surface of the base allows any liquids or other debris spilled on the top surface to drain off the top surface toward the outer surface and over the outer edge.

15 Claims, 1 Drawing Sheet

REVOLVING SOLAR POWERED FLOWER POT SAUCER

The present application claims the benefit of priority of pending provisional patent application Ser. No. 61/130,089, filed on May 28, 2008, entitled "Revolving Solar Powered Flower Pot Saucer".

BACKGROUND OF THE INVENTION

1. Field of the Invention

This invention relates generally to a revolving solar powered flower pot saucer and, more particularly, the invention relates to a revolving solar powered flower pot saucer designed to rotate via solar power.

2. Description of the Prior Art

Many people enjoy houseplants; in fact, raising them is one of the fastest growing indoor hobbies. An integral part of indoor decor, especially in winter, caring for houseplants offers satisfying opportunities for people who like to work with living things and watch them develop. Plants are not only beautiful in the home, but they also help cleanse the air. Bamboo palm, Spider plant, flowering Mums, Peace lily, and Mother-in-laws-tongue are just a few of the best houseplants for purifying air in a room, according to an ongoing study by NASA and the Associated Landscape Contractors of America (ALGA). At the same time, these are some of the easiest plants to grow and the most attractive to use for interior decorating. Fulfilling a unique niche in the indoor landscape, a few strategically placed large indoor plants can transform virtually any ordinary space into a slice of the tropics.

SUMMARY

The present invention is a flower pot saucer for receiving a flower pot or the like. The flower pot saucer comprises a base having an outer surface and a flat annular top surface angled downward toward the outer surface. A revolving saucer is mounted within top surface of the base with the flower pot positionable upon the revolving saucer. At least one solar panel is positioned on the angled top surface of the base. A motor is mounted within the base and powered only by the solar panel with the motor connected between the solar panel and the revolving saucer and the motor causing the rotation of the revolving saucer wherein the junction of the outer surface and the top surface of the base creates an outer edge and wherein the angling of the top surface of the base allows any liquids or other debris spilled on the top surface to drain off the top surface toward the outer surface and over the outer edge.

The present invention further includes method for rotating a flower pot or the like. The method comprises providing a base having an outer surface and a flat annular top surface angled downward toward the outer surface, creating an outer edge at the junction of the top surface and the outer surface, mounting a revolving saucer within top surface of the base, positioning the flower pot upon the revolving saucer, positioning at least one solar panel on the angled top surface of the base, mounting a motor mounted within the base, powering the solar panel by the motor, rotating the revolving saucer, and draining any liquids or other debris spilled on the top surface down the angled surface toward the outer surface and over the outer edge.

DETAILED DESCRIPTION OF THE PREFERRED EMBODIMENTS

Figure 1:
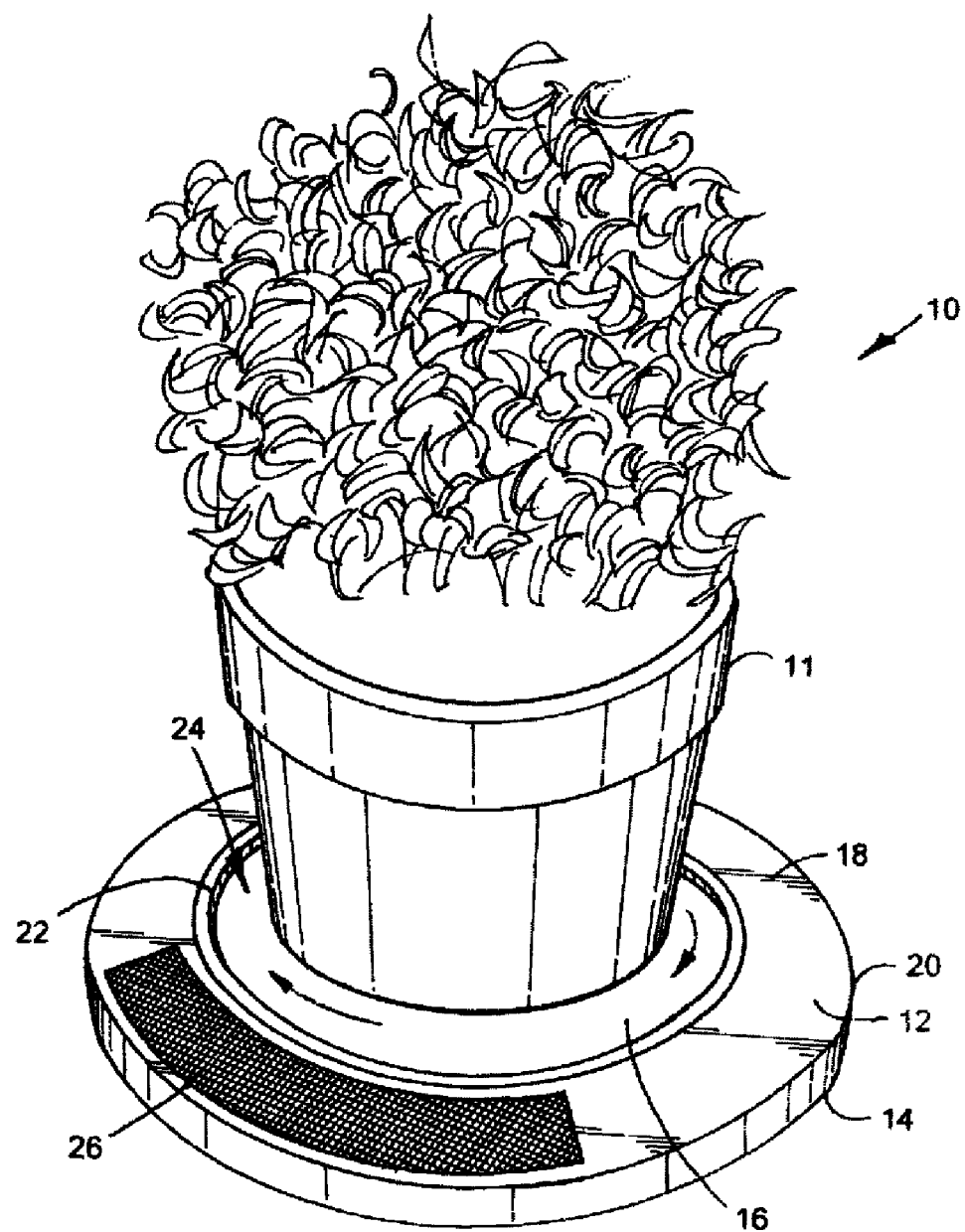
FIG. 1 is a perspective view illustrating a revolving solar powered flower pot saucer, constructed in accordance with the present invention.

As illustrated in FIG. 1, the present invention is a revolving solar powered flower pot saucer, indicated generally at 10, for automatically rotating a flower pot 11 placed thereon. The flower pot saucer 10 of the present invention has a base 12 having an outer surface 14 and a revolving saucer 16 within the base 12. The base 12 further has a flat annular top surface 18 angled downward from the saucer 16 to the outer surface 14. The junction of the outer surface 14 and the top surface 18 of the base 12 creates an outer edge 20. The angling of the top surface 18 of the base 12 allows any liquids or other debris spilled on the top surface 18 to drain off the top surface 18 toward the outer surface 14.

In a preferred embodiment of the flower pot saucer 10 of the present invention, the revolving saucer 16 does not extend completely to the outer edge 20 of the base 12 creating the non-revolving top base surface 18. The saucer is free from extension completely to the outer edge of the base. Around a perimeter edge of the saucer 16 is an annular lip 22. The annular lip 22 creates a recessed area 24 for receiving the flower pot 11. In a preferred embodiment, a top surface of the annular lip 22 is flush or even with the top surface 18 of the base 12. Maintaining the annular lip 22 flush with the top surface 18 of the base 12 permits easy cleaning of any fluids or debris which may fall on the annular lip 22 allowing a user to simply wipe the top surface of the annular lip 22 onto the top surface 18 of the base 12 and off the flower pot saucer 10.

At least one solar panel 26 is positioned on the angled top surface 18 of the base 12 of the flower pot saucer 10 of the present invention. Preferably, the solar panel 26 is flush with the top surface 18 of the base 12 and powers the saucer 16 to revolve in a circular direction. With the solar panel 26 mounted flush on the flat angled top surface 18, the entire solar panel 26 faces outward thereby efficiently capturing the most sunlight.

The flower pot saucer 10 of the present invention further includes appropriate gearing between a motor and the saucer 16 for the rotation of the saucer 16. A potted plant 11 can be positioned on the saucer 16 within the recessed area 24 thereby ensuring plant lovers that their greenery is receiving the proper amount of sunlight, without having to periodically manually rotate heavy potted plants.

Creatively designed, the flower pot saucer 10 of the present invention can be offered in a wide variety of sizes and styles. Sized to accommodate both small and large plants, the flower pot saucer 10 can receive flower pots 11 as a standard conical flower pot shape, a circular, tub-like container, or a functional round, square or rectangular configuration. Additionally, the materials used to construct the flower pot saucer 10 can range from durable plastic or terra cotta to a more ornate metal material such as copper. It should be noted that the flower pot 11 can be separate from the saucer 16 or secured to the saucer 16, depending on the desires of the manufacturer or user.

Unique to the flower pot saucer 10 of the present invention and what sets it apart from standard plant containers are the solar panel 26 on the top surface 18 of the base 12 and companion motor located within the base 12. The solar panel 26 preferably has a substantially rectangular shape; like standard solar powered fixtures, the solar panel 26 can use standard solar cells in a very straightforward application. For instance, a single solar cell produces approximately 0.45 volts and a varying amount of current depending on the size of the cell and the amount of light striking the surface. In a solar panel sized for the present invention, therefore, one needs four cells wired in series. In the flower pot saucer 10, the four cells produce 1.8 volts and a maximum of about 100 milliamps in full. bright sunlight. The solar cells are wired directly to the internal motor through a diode. The diode inhibits the motor's current from flowing back through the solar cell at night.

The flower pot saucer 10 of the present invention can be put to use in a matter of seconds. Placing the flower pot saucer 10 near a window, a potted plant is positioned on top of the revolving saucer 16. As the sunlight hits the solar panel 26, the saucer 16 via the motor within the base 12 begins to automatically rotate, moving the leaves away from the direction of too much powerful sunlight.

The flower pot saucer 10 of the present invention affords users several significant benefits and advantages. Foremost, the flower pot saucer 10 allows plant lovers to ensure proper care of plants with no manual labor involved. Featuring a solar powered, rotating saucer 16, the flower pot saucer 10 absorbs the weight of the plant and its potting soil, permitting the container to be effortlessly rotated via the light of the sun. In this manner, consumers avoid the risk of muscle injuries that could result from attempting to heft a cumbersome indoor tree or flower. In addition, the flower pot saucer 10 eliminates the need to move a heavy plant by grabbing its trunk, thus allowing the rooting to remain intact and avoiding damage to foliage. Moreover, the flower pot saucer 10 alleviates the risk that plants will receive too much sunlight, allowing them to remain lush and green for a much longer period of time. Constructed of durable, high quality materials, the flower pot saucer 10 will withstand years of continued use.

The flower pot saucer 10 of the present invention makes the care and maintenance of large potted plants extremely easy and convenient without the use of battery or electric power. Simply placed on a floor or window sill, the flower pot saucer 10 also allows users to effortlessly arrange their plants in any desired configuration. The flower pot saucer 10 of the present invention can be used in household, commercial, or industrial applications.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A flower pot saucer for receiving a flower pot, the like, the flower pot saucer comprising:
    a base having an outer surface and a flat annular top surface angled downward toward the outer surface;
    a revolving saucer mounted within the top surface of the base, the flower pot positionable upon the revolving saucer;
    at least one solar panel positioned on the angled top surface of the base;
    a motor mounted within the base and powered only by the solar panel, the motor connected between the solar panel and the revolving saucer, the motor causing the rotation of the revolving saucer;
    wherein the top surface of the base is free from any apertures;
    wherein a junction of the outer surface and the top surface of the base creates an outer edge; and
    wherein the angling of the top surface of the base allows any liquids or other debris spilled on the top surface to drain off the top surface toward the outer surface and over the outer edge.

2. The flower pot saucer of claim 1 wherein the revolving saucer has an annular lip around a perimeter edge, the annular lip creating a recessed area for receiving the flower pot.

3. The flower pot saucer of claim 2 wherein a top surface of the annular lip is flush with the top surface of the base.

4. The flower pot saucer of claim 1 wherein the solar panel is flush with the top surface of the base.

5. The flower pot saucer of claim 1 and further comprising:
    gearing between the motor and the revolving saucer for the rotation of the revolving saucer.

6. A method for rotating a flower pot, the method comprising:
    providing a base having an outer surface and a flat annular top surface angled downward toward the outer surface;
    creating an outer edge at a junction of the top surface and the outer surface
    mounting a revolving saucer within top surface of the base;
    positioning at least one solar panel on the angled top surface of the base;
    maintaining the top surface of the base free from apertures;
    mounting a motor mounted within the base;
    powering the solar panel by the motor;
    rotating the revolving saucer; and
    draining any liquids or other debris spilled on the top surface down the angled surface toward the outer surface and over the outer edge.

7. The method of claim 6 and further comprising:
    forming an annular lip around a perimeter edge of the revolving saucer; and
    creating a recessed area for receiving the flower pot.

8. The method of claim 7 wherein a top surface of the annular lip is flush with the top surface of the base.

9. The method of claim 6 wherein the solar panel is flush with the top surface of the base.

10. The method of claim 6 and further comprising:
    positioning gearing between the motor and the revolving saucer for the rotation of the revolving saucer.

11. A flower pot saucer for receiving a flower pot, the like, the flower pot saucer comprising:
    a base having an outer surface and a flat annular top surface angled downward toward the outer surface;
    a revolving saucer mounted within top surface of the base;
    an annular lip formed around a perimeter edge of the revolving saucer, the annular lip being flush with the top surface of the base;
    at least one solar panel positioned on the angled top surface of the base, each solar panel facing completely outward;
    a motor mounted within the base and powered only by the solar panel, the motor connected between the solar panel and the revolving saucer, the motor causing the rotation of the revolving saucer;
    wherein a junction of the outer surface and the top surface of the base creates an outer edge; and wherein the angling of the top surface of the base allows any liquids or other debris spilled on the top surface to drain off the top surface toward the outer surface and over the outer edge.

12. The flower pot saucer of claim 11 wherein the annular lip creates a recessed area for receiving the flower pot.

13. The flower pot saucer of claim 11 wherein the solar panel is flush with the top surface of the base.

14. The flower pot saucer of claim 11 and further comprising:
gearing between the motor and the revolving saucer for the rotation of the revolving saucer.

15. The flower pot saucer of claim 11 wherein the flower pot saucer is useable in household, commercial, and industrial areas.

* * * * *